US006486874B1

(12) United States Patent
Muthuswamy et al.

(10) Patent No.: US 6,486,874 B1
(45) Date of Patent: Nov. 26, 2002

(54) METHOD OF PRE-CACHING USER INTERACTION ELEMENTS USING INPUT DEVICE POSITION

(75) Inventors: Sivakumar Muthuswamy, Plantation, FL (US); Joseph G. Gillette, Margate, FL (US)

(73) Assignee: Motorola, Inc., Schaumburg, IL (US)

( * ) Notice: Subject to any disclaimer, the term of this patent is extended or adjusted under 35 U.S.C. 154(b) by 92 days.

(21) Appl. No.: 09/706,894

(22) Filed: Nov. 6, 2000

(51) Int. Cl.[7] ................................. G09G 5/00
(52) U.S. Cl. ............... 345/173; 178/18.01; 345/863
(58) Field of Search .............. 178/18.01–18.09, 178/19.01–19.07; 345/173–179, 810, 812, 862–864

(56) References Cited

U.S. PATENT DOCUMENTS

| | | | |
|---|---|---|---|
| 4,040,010 A | | 8/1977 | Crane et al. |
| 4,040,012 A | | 8/1977 | Crane et al. |
| 4,086,567 A | | 4/1978 | Crane et al. |
| 4,246,439 A | * | 1/1981 | Romein ................ 178/19.02 |
| 4,646,351 A | | 2/1987 | Asbo et al. |
| 4,980,519 A | * | 12/1990 | Mathews ............... 178/19.01 |
| 5,029,219 A | | 7/1991 | Cox |
| 5,081,686 A | | 1/1992 | Cox |
| 5,274,362 A | * | 12/1993 | Potvin .................. 178/18.02 |
| 5,347,589 A | | 9/1994 | Meeks et al. |
| 5,434,928 A | | 7/1995 | Wagner et al. |
| 5,647,017 A | | 7/1997 | Smithies et al. |
| 5,818,955 A | | 10/1998 | Smithies et al. |
| 5,892,824 A | | 4/1999 | Beatson et al. |
| 6,144,371 A | * | 11/2000 | Clary et al. ................ 345/173 |
| 6,222,522 B1 | * | 4/2001 | Mathews et al. ......... 178/19.01 |
| 6,281,888 B1 | * | 8/2001 | Hoffman et al. ......... 178/18.01 |
| 6,326,957 B1 | * | 12/2001 | Nathan et al. .............. 345/173 |

OTHER PUBLICATIONS

Synaptics (UK) limited—"Pen Sensing", ASIC Data Sheet.
CrossPad "Portable Digital Notepad".
Gyration "GyroMouse™ Pro" (www.gyration.com; sales@gyration.com).

* cited by examiner

Primary Examiner—Richard Hjerpe
Assistant Examiner—Alexander Eisen
(74) Attorney, Agent, or Firm—Randi L. Dulaney (57) ABSTRACT

A method (60) of pre-caching user interaction elements, includes monitoring motion patterns (40) with an electronic input device having a gesture recorder and a writing surface using a three-dimensional position of the recorder with respect to the writing surface, analyzing the monitored motion patterns (42) made while the recorder is off the writing surface to determine if the recorder is approaching a target area at the writing surface (44), the target area having an associated functionality, and triggering the functionality (50)before contact between the recorder and the target area. The steps are repeated continuously. The analyzing step (42) determines if the recorder is moving towards the writing surface, and, if so, a two-dimensional location of the recorder with respect to the plane of the writing surface is determined (46) and a trajectory is defined based upon the location and movement of the recorder off the writing surface. A control area disposed at an endpoint of the trajectory is identified (48) as the target area to be triggered. Alternatively, a plurality of trajectories between the recorder and a control area is defined based upon recorder location and movement off the writing surface and correlated with the actual trajectory. For the trajectory with the highest degree of correlation, a corresponding control area is defined as the target area to be triggered. Triggering of multiple control areas can be simultaneous or sequential. The method can be used with a variety of systems including an inductive stylus and tablet system and a radio frequency stylus and tablet system.

20 Claims, 5 Drawing Sheets

METHOD OF PRE-CACHING USER INTERACTION ELEMENTS USING INPUT DEVICE POSITION

CROSS REFERENCE

This application is related to pending U.S. application Ser. No. 09/659,809, filed Sep. 11 2000, by Gillette, et al., entitled "Method of Analyzing a Handwriting Gesture," and assigned to Motorola, Inc.

BACKGROUND OF THE INVENTION

1. Field of the Invention

The invention lies in the field of electronic input devices. The invention relates to a method of pre-caching user interaction elements based on input device position.

2. Description of the Related Art

There have been many recent advances in personal, hand-held computer technology, typically referred to as Personal Digital Assistants (PDAs), Palm PCs, or Pocket PCs.

Recently, various types of hand held electronic devices for personal data organization have been successfully marketed. One such type of device is a PDA sold under the trademarks PALMPILOT, PALM III, PALM IV, AND PALM V, available from Palm Computing of Mountain View, Calif. a 3COM company. These PDAs include control buttons and a touch-sensitive screen with touch-sensitive screen activation areas displayed thereon. PDAs typically display phone numbers, to-do lists, calendars, digitally stored maps, directions, etc., all of which are accessible through touching the activation areas and/or control buttons.

A separate hand-held pen or stylus is included to activate the touch-sensitive screen activation areas. The touch-sensitive screen activation areas can include data entry portals. To enter data into the PALMPILOT, one either uses an on-screen keyboard or an on-screen GRAFFITI-based writing "pad" that responds to a form of shorthand. Both of these data entry devices require implementation of the stylus. The on-screen keyboard enables the user to input alphanumeric characters, for example. Corresponding software enables the pad to recognize/read the handwritten gestures made while the stylus lies upon and/or travels over the tablet and either interprets the gestures as a command for executing a given function or translates the gestures into a digital representation.

Force-based stylus systems inherently rely upon contact between the stylus and the writing surface. Thus, typical force-based systems are unable to receive stylus data when the stylus is not contacting the writing surface. Additionally, force-based systems inherently do not provide a measurement of stylus speed across the writing surface.

U.S. Pat. No. 5,347,589 to Meeks et al. discloses a system for displaying handwriting parameters in which the pen speed is used to modulate an envelope around the trace on the display. The system allows a side by side comparison of a stored reference signature and a newly penned signature for verification purposes. In other conventional pen-speed based dynamic signature analysis systems, an analog signal proportional to the tangential pen speed across a surface is generated. The system correlates the signal to a reference signal and reports the degree of correlation. Another system provides automatic verification based on use of a pen having an accelerometer and a pressure sensor, in which the pen acceleration and pressure are used internally as the discriminants. Another system determines the X and Y components of pen speed and uses the magnitude of the differences in the velocity vectors as an internal discriminant.

A first drawback to the touch-sensitive systems is that the stylus-based action is dependent solely upon direct contact between the stylus and the touch-sensitive screen. In other words, when the stylus is not in contact with the touch-sensitive screen, computer activity based upon stylus use or position is not altered, carried out, or executed, and stylus position information is neither conveyed to the touch-sensitive screen nor used by the internal computing device.

The touch-sensitive screen activation areas can also include on-screen controls that are defined by particular defined areas that, when touched, implement predetermined changes or functionality in computer activity. Examples of controls that are defined by areas of the touch-sensitive screen include icons representing software functionality and pull-down menus. These areas can be bit-mapped, for example. Such menus include, for example, word processing functions in a word processor, i.e., "File," "Edit," "View," "Insert," "Format," "Tools," "Table," "Window," and "Help." Presently, enabling a touch-sensitive screen activation area can be performed only by actually touching the screen with the stylus directly above a particular control area.

Accordingly, a second drawback in existing touch-sensitive systems lies in the fact that the computer begins to implement the functionality of the control areas or preliminary actions that are necessary to execute the functionality only when and after the stylus has actually touched the screen directly above a particular control area. Implementation of the functionality or the preliminary actions does not occur before such contact.

Enabling software functionality by loading in or caching a particular software program takes time. For example, a software program, such as a word processor, a calendar, or an address list, takes time to fully load into the computer's memory after the instruction is given to activate that program (i.e., touch for PDAs and double-click for desktop/laptop computers).

Therefore, a third drawback to the existing touch-sensitive systems is evidenced by an implementation delay of the control area functionality, the implementation not taking place until after the stylus actually touches the particular position defining the control area.

While none of the existing touch-sensitive, stylus/tablet, hand-held computer systems employ a stylus and tablet that are independent from direct contact between the stylus and the tablet, various electronic stylus-based systems do exist that can employ this feature. Two systems that presently define the state of the art for technology that is partially independent from the direct contact between a stylus and a tablet include inductive coupling and radio frequency systems.

One inductive coupling pen-sensing system is produced by Synaptics, Inc. That inductive system operates by using a modulated inductive coupling between a fixed and a moving point to enable precise measurement of a relative position between the two points. Specifically, the system measures the relative position of the tip of a pen relative to a pen-based computer. A printed circuit board of the system contains tracks that are used as a fixed sensing coil. A fixed excitation coil is positioned between the printed circuit board and a liquid crystal display (LCD). A passive pen containing a capacitor and a coil is used for "writing" upon the LCD. This system can track and record the movement of the pen upon the LCD. Significantly, the device is able to sense the location of the pen at a distance from the surface of the LCD. For conventional power outputs, the system can track the pen at a distance of up to approximately one-half (0.5) inch from the LCD surface.

An example embodiment of a radio frequency ("RF") pen-sensing system is produced by the CROSS pen computing group and is referred to as the CROSSPAD device. The pen in this system contains a small RF transmitter that sends pen stroke data to the notepad. Because the transmitter sends radio signals, this system can track and record the movement of the pen at a distance from the surface of the display.

Consumers judge and differentiate electronic products based on response speed, seamless navigation, and Graphical User Interface (GUI) ease-of-use. GUIs with menus, hypertext, and graphical selection features are becoming more common, and the GUI screen density of these features in electronic devices is increasing rapidly to accommodate increasing functionality. This situation is particularly acute for wireless devices that tend to be small in size and that have small, low-resolution displays.

Prior art user-assist technologies (such as "Tool Tips" in WINDOWS and highlighting/roll-over when a cursor passes over a hyperlink) use two-dimensional information (i.e., the X-Y position on a screen). These user-assist technologies can be referred to as anticipation alerts. The systems employing the technology, however, have many limitations.

One of these limitations is inadvertent activation. A user typically moves on and along the screen plane when moving between different locations on the screen. A screen typically contains many different control areas, hot spots, or hyperlinks. Thus, when only two-dimensional technology is used to traverse the screen, the user moves over many control areas. In such a case, the user does not want to enable the control areas that are being passed over; the user only wants to enable the target control area. But, because the intermediate areas appear directly in the path of the desired control area, there is a high probability of inadvertent activation of the intermediate control area as the cursor traverses over that hyperlink or hot spot. Such inadvertent activation is referred to as a false alert.

A second limitation is access time. Because of the reduction and elimination of many conflicts between general motion within a particular screen on the tablet and the control area interaction, two-dimensional systems take more time to trigger the anticipation alert (as compared with three-dimensional stylus tracking systems).

A third limitation is recorder tracking. Actual motion in two-dimensional devices is tracked only when the stylus is in contact with the tablet, i.e., the active input area. The third-dimensional movement is not tracked.

The prior art, therefore, indicates a need for making PDA operation faster and more convenient. Further, a more convenient method of and device for precisely touching selected activation areas on a PDA touch-sensitive screen is needed.

SUMMARY OF THE INVENTION

The invention provides a method and a device for pre-caching user interaction elements using input device position that overcomes the above-mentioned disadvantages of the heretofore-known methods and devices of this general type and that, for many different hand-held electronic input systems, frees the touch-based screen control system from being solely dependent upon direct contact between the stylus and the touch-sensitive screen, implements the preliminary actions that are necessary to execute the function assigned to an identified control area before the stylus has actually touched the screen at that particular control area, and reduces the waiting time for activating a given software functionality.

In other words, before the stylus is contact with the screen, computer activity based upon stylus use or position can be altered, carried out, or executed, and stylus position information can be conveyed to and used by the internal computing device.

The invention provides a pre-caching system that anticipates the likely interaction of the user with the system based upon a three-dimensional location and motion of the pointing device, i.e., the stylus. Specifically, the invention captures the non-contact movements of the stylus during use. As used herein, the term pre-caching is defined as those preliminary actions that are necessary to execute the function that is assigned to an identified control area.

Also, the terms gesture or motion patterns are defined as any three-dimensional movement of a user's hand. The gesture can be a movement, a handwritten symbol, or it can be the user's signature. Pen or stylus as used herein can refer to any object held by a user for sending information that electronically and/or digitally captures a user's hand movement. Similarly, tablet, pad, or like terms refer to any surface, tangible or intangible, defined with respect to the pen for measuring gestures traced by the pen in a hand of a user.

To provide the above-described advantages, the method and device of the invention not only use pen-down information, they also use pen-up information. Pen-down information includes information collected by the electronic pen/tablet system when the pen actually contacts the defined writing surface, i.e., the surface of a tablet. In contrast, pen-up information is defined as information collected by the electronic pen/tablet system when the pen is away from the defined writing surface. Pen-up information is also referred to as hidden data.

Other features that are considered as characteristic for the invention are set forth in the appended claims.

Although the invention is illustrated and described herein as embodied in a method of pre-caching user interaction elements using input device position, it is nevertheless not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case.

Figure 1:
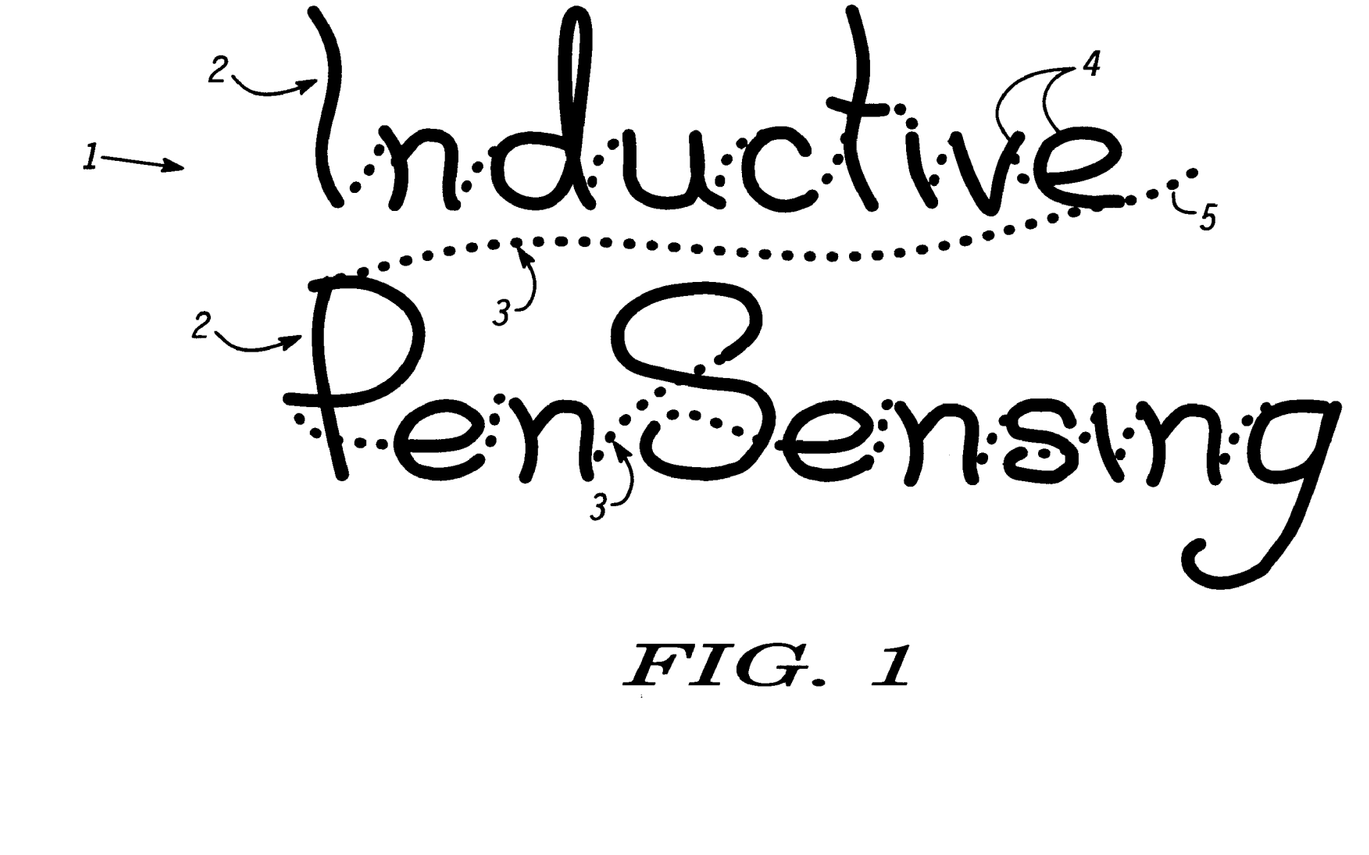
FIG. 1 is an illustrative representation of a motion pattern according to the invention.

Referring now to the figures of the drawings in detail and first, particularly to FIG. 1 thereof, there is shown an illustrative representation of a motion pattern 1 for the words "Inductive Pen Sensing". For presently existing three-dimensional-sensing technologies, the systems are able to read both the pen-down information 2 and the pen-up or hidden data information 3. Typically, these systems translate the pen-down information 2 into a plurality of line segments that, together, form that part of the gesture that, for example, would appear on a piece of paper. The pen-down information is represented in FIG. 1 as solid line segments 4. The systems also have the ability to translate hidden data information 3 that, after a motion pattern is made, would form no part of the gesture that appeared on a piece of paper. The hidden data information 3 forms the three-dimensional tracing of the pen/stylus 8 point as it moves above and is not in contact with the writing surface 7 (FIG. 2) between individual letters and/or words, for example. The two-dimensional representation of the hidden data information 3 (in the X-Y coordinate plane coplanar with the tablet surface) is shown in FIG. 1 as dotted line segments 5. A relative position 9 of the stylus away from the tablet (the Z coordinate of the hidden data information 3) is shown, for example, in FIG. 5. Such existing reading methods and devices are not described in further detail.

Figure 2:
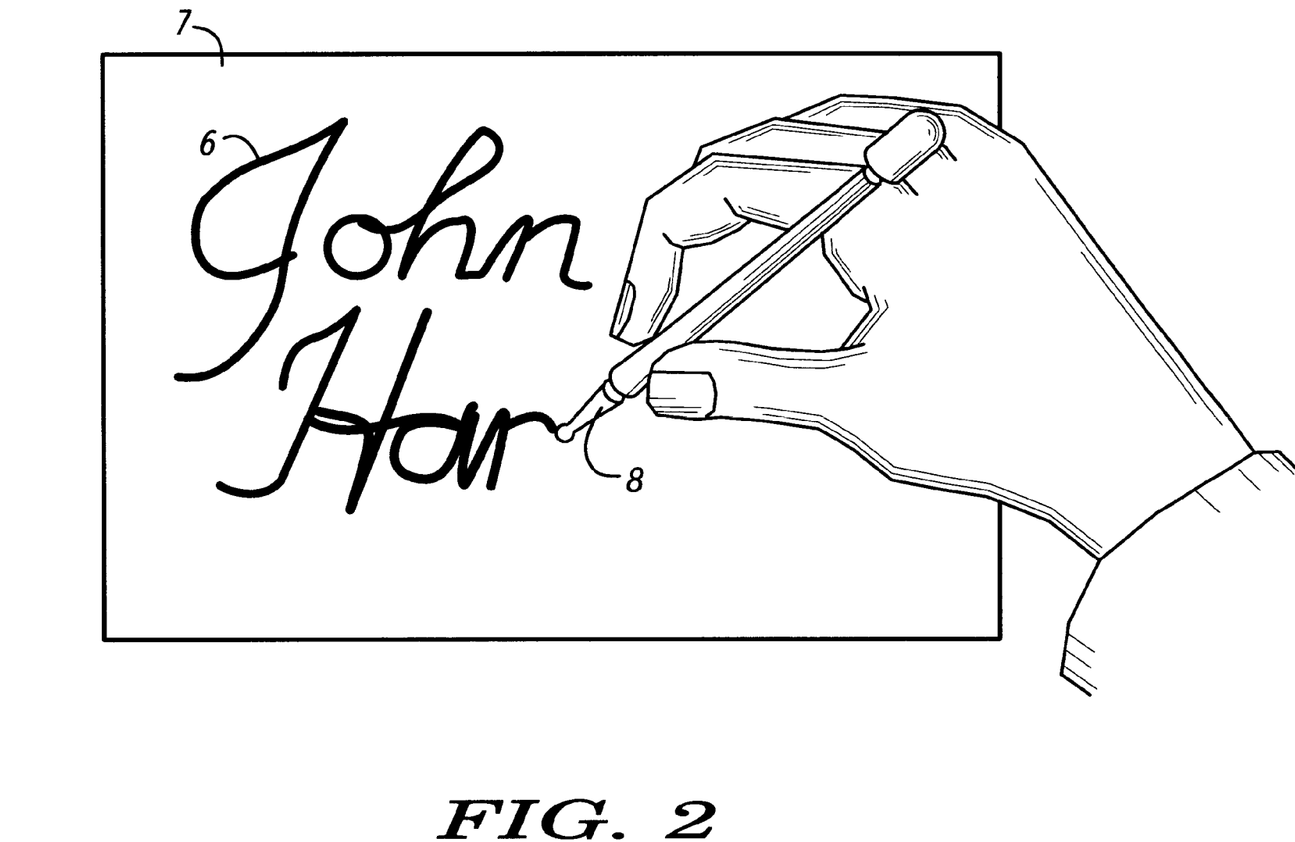
FIG. 2 is an illustrative representation of a motion pattern upon a writing surface.
Figure 3:
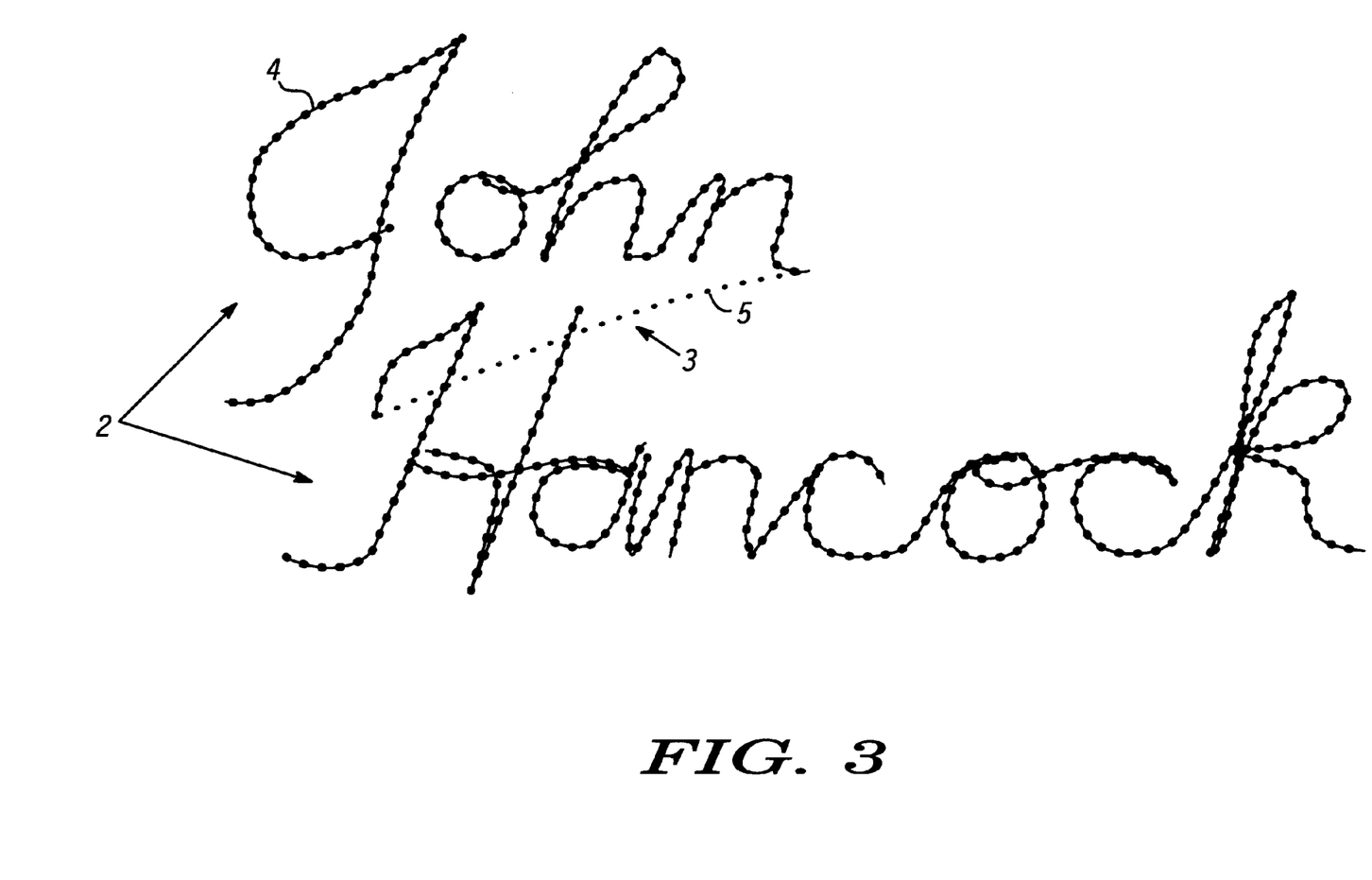
FIG. 3 is an illustrative representation of the motion pattern of FIG. 2 applying the method according to the invention.
Figure 4:
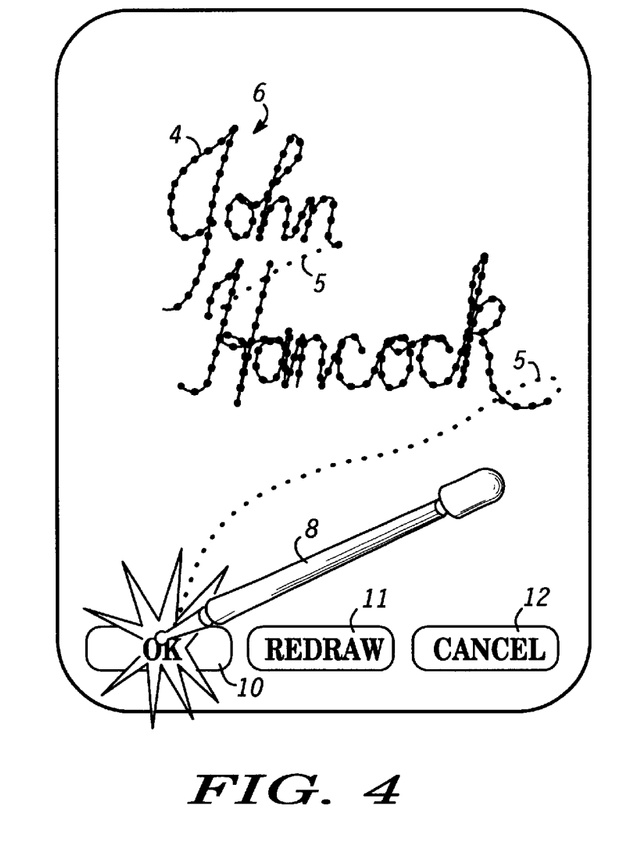
FIG. 4 is a plan view of a writing surface with an illustrative representation of a motion pattern of FIG. 3 applying the method according to the invention.

Respectively, FIGS. 2 and 3 show a portion of and the entirety of another motion pattern 6 forming the words "John Hancock". Applying the method according to the invention for this example, the pen-sensing systems capture both the pen-down information 2 and hidden data information 3 from the motion pattern or signature 6. The systems can translate and store the pen-down information 2 into a plurality of line segments 4 that, together, form that part of the gesture that, for example, would appear on a piece of paper. See, for example, FIG. 2. The pen-down information 2 is represented in FIGS. 3 and 4 as solid line segments 4. The systems can also translate and store the hidden data information 3 into a plurality of three-dimensional coordinates, including the two dimensional tracing 6 of the X- and Y-coordinates on the tablet plane 7 and the third dimensional stylus position 9 away from the tablet plane 7. See FIG. 5. Thus, the hidden data information 3 includes information to form a three-dimensional tracing of the pen 8 point as it moves above and is not in contact with the writing surface 7 between, for example, individual letters and/or words and/or bit-mapped control areas 10, 11, 12. See FIG. 4. A two dimensional tracing of the X- and Y-coordinates of the hidden data information 3 is represented in FIGS. 3 and 4 as dotted line segments 5.

After the pen-down 2 and hidden data information 3 are captured within pen-sensing systems, the prior art systems presently perform a conventional analysis only of the pen-down information 2. Applying the method, however, the systems also analyze the hidden data information 3. Because the entire gesture is analyzed, the method according to the invention frees the prior art touch-based screen control systems from being solely dependent upon direct contact between a stylus 8 and a touch-sensitive screen 7, implements preliminary actions necessary to execute a respective function that is assigned to a respective control area 10, 11, 12 before the stylus 8 has actually touched the screen at the particular control area 10, 11, 12, and reduces the waiting time for activating a given software functionality. The method of the present invention provides all of these advantages for many different hand-held electronic input systems.

Figure 6:
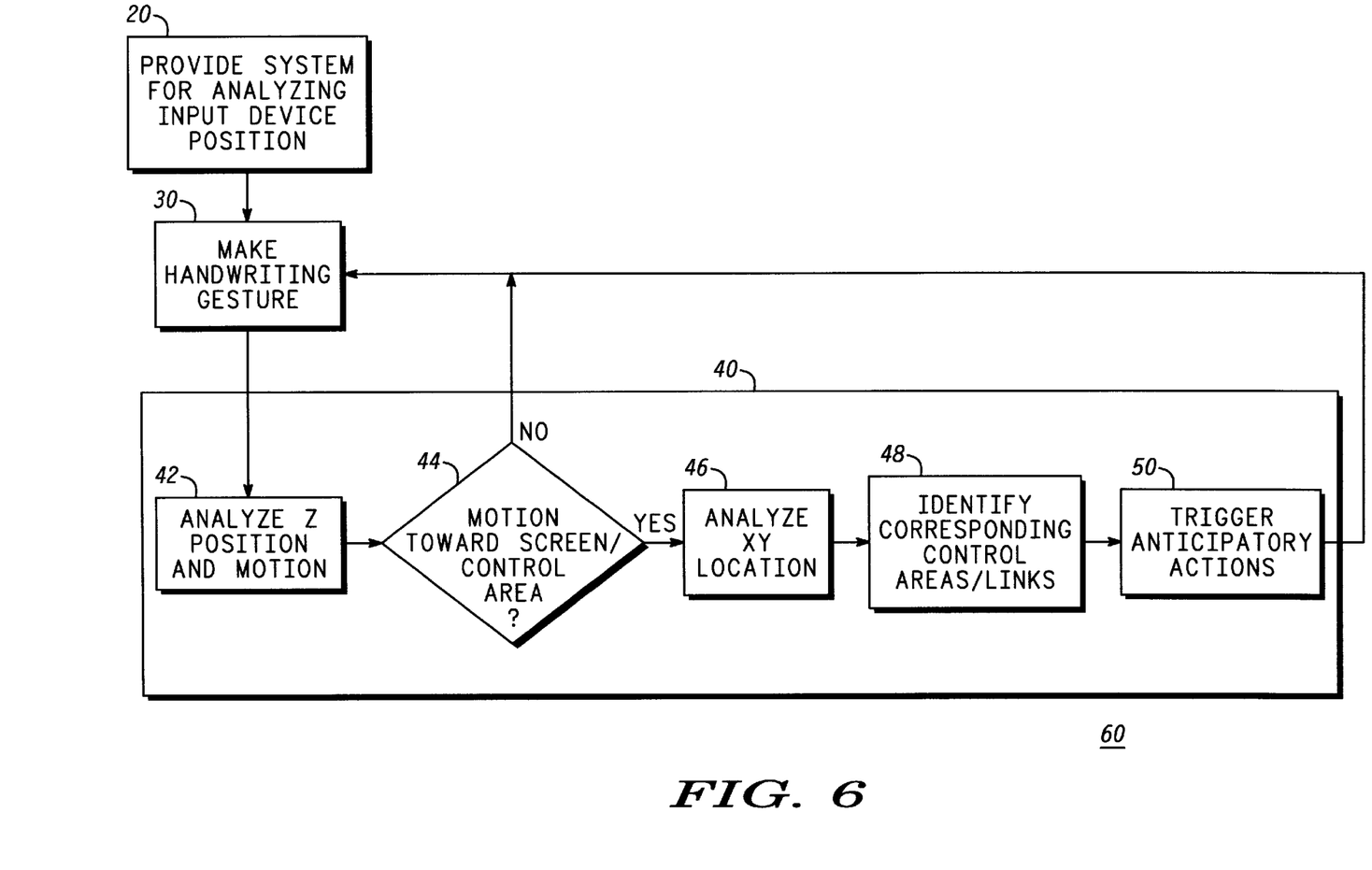
FIG. 6 is a flow chart of the method according to the invention.

The method according to the present invention is explained in further detail with regard to FIG. 6. The method 60 as described herein includes a description of various preferred and alternative embodiments. The description should not be construed as disclosing the only way to perform the method.

A system for pre-caching user interaction elements using input device position is provided in step 20. In step 30, an input device user makes a motion pattern 6 upon a writing surface 7 using a gesture recorder 8. In a preferred embodiment, the gesture recorder 8 is a hand-held pen or stylus. The system performs the prior art functions of monitoring the contacting position of the stylus 8 and of executing functionality based upon such contact.

The system according to the invention continuously monitors and records the motion pattern in step 40, including the motion patterns made while the stylus 8 is on the writing surface 7 and the movements made while the stylus 8 is off the writing surface 7. Preferably, the movements on the writing surface 7 correlate to a planar space using X and Y coordinates. Also preferably, the movements off the writing surface 7 correlate to a three-dimensional space on and above the writing surface 7 using X, Y, and Z coordinates.

In step 42, both the stylus position 9 (Z-coordinate) and stylus motion 13 in the Z-direction are monitored—the Z-direction defined as a direction normal to the writing/screen surface. In step 44, the stylus position 9 and motion 13 are analyzed to determine whether or not the stylus 8 is moving towards the tablet 7. If the determination is negative, then steps 30, 42, and 44 are repeated until it is determined that the stylus 8 is moving towards the tablet 7. When the moving-towards-tablet determination is positive, in step 46 the X-Y location of the stylus 8 is determined and analyzed.

In step 48, control areas, links, and the like 10, 11, 12 corresponding to the X-Y location of the stylus 8 are identified. Preferably, individual control areas 10, 11, 12 are large enough so that only one control area 10, 11, 12 is identified in this step. When the corresponding control area 10, 11, 12 has been identified, in step 50, the system pre-caches (i.e., triggers) the functionality corresponding to that identified control area. In other words, before the stylus 8 actually touches the control area, the system begins executing the preliminary actions that are necessary to execute the function that is assigned to that identified control area. Alternatively, more than one control area 10, 11, 12 can be identified. Each corresponding functionality of the control areas can be pre-cached simultaneously or sequentially, with the multiple pre-caching continuing until a single control area 10, 11, 12 is identified. The system then returns to the continuous monitoring and recording of motion patterns.

Figure 5:
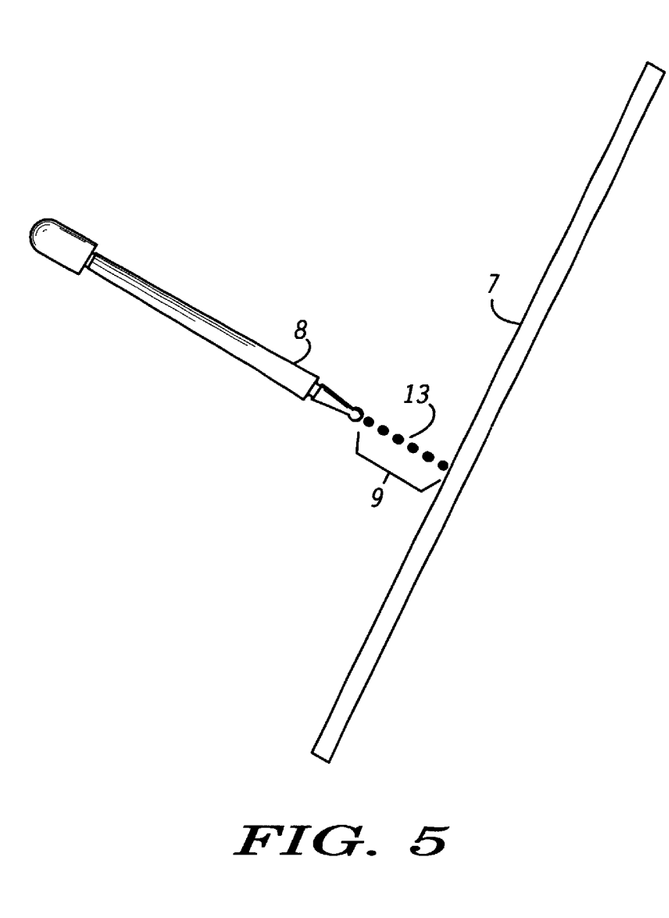
FIG. 5 is a side-elevational view of the writing surface of FIG. 4 applying the method according to the invention.

The following is an illustrative example of the method of the invention using FIGS. 4 and 5 and applying the steps of FIG. 6. The example is not intended to be limited to the steps described. Nor is the example intended to be construed as the only example for use of the invention.

The example involves a user entering a handwritten signature 6 using an electronic input device having stylus 8 and a user interface screen 7 with defined control areas 10, 11, 12. The pen sensing system is configured to continuously monitor and record the position of the stylus in all three-dimensions. For this example, the system is configured with three control areas. The first—"OK" is a function that tells the system that the signature just written is acceptable. The second—"Redraw", is a function that tells the system that the signature just written is not acceptable and that the signature will be redrawn again. The third—"Cancel", is a function that tells the system that the signature writing process will be aborted.

The user writes the signature 6 upon the user interface screen 7 using the stylus 8. See step 30 of FIG. 6. While writing occurs, the system monitors and records the signature 6, including the signature movements made while the stylus 8 is on the user interface screen 7 and the movements made while the stylus 8 is off the user interface screen 7. See step 40. In combination with the monitoring and recording, the system is able to electronically display the signature 6 upon the user interface screen 7 as shown in FIG. 4. See also FIG. 2. However, even though the system records the hidden data information 3, the system preferably does not display the hidden data 3.

Also while writing occurs, the system monitors both the stylus position 9 (see FIG. 5) and the stylus motion 13 in the Z-direction, i.e., the three-dimensional approach path. While writing occurs, the stylus position 9 and motion 13 are analyzed to determine whether or not the stylus 8 is moving towards the tablet 7. See steps 42 and 44. These features are repeated throughout the writing of the signature. Until the "k" in "Hancock" is finished, the determination is answered in the negative because the stylus 8 is not moving towards the tablet 7. For this example, the movements between the "J" and "o" and the "n" and "H" have been disregarded.

After writing the "k" in "Hancock", the user will lift the stylus 8 off the user interface screen and move the stylus 8 up and over to the control area 10 labeled "OK". This movement will be referred to as the stylus trajectory.

One possible analysis method determines that the stylus 8 is moving towards the tablet 7 just after the apex of the trajectory. See step 44. At the liftoff point, the X-Y location of the stylus 8 is determined and analyzed. See step 46. The system then attempts to identify a corresponding control area 10, 11, 12 that the user will be enabling. The system projects the trajectory in two or three dimensions. The system can readily determine that control area 10 will be selected by the user because only one control area 10 appears in the trajectory defined from the end point of the "k" in the signature towards the point corresponding to the apex of the trajectory, or any other point in the trajectory. See step 48. Thus, the system begins to pre-cache (i.e., trigger) the preliminary actions that are necessary to execute the functionality corresponding to control area 10 well before the user actually touches the stylus 8 to the control area 10. See step 50. In other words, before the stylus 8 actually touches control area 10, the system begins execution of the function assigned to control area 10. The system then returns to the continuous monitoring and recording of stylus movement.

Because the system tracks the three-dimensional position of the stylus 8, the system does not have to wait until the apex to make the pre-caching determination.

In another possible method, the system does not even have to wait for motion towards the screen, thus eliminating the determination of an apex. Because there are only three possible control areas 10, 11, 12 for this example, the system knows that three possible trajectories will most likely occur from the endpoint of a signature. Once the system detects that the stylus 8 is moving towards control area 10 (see FIG. 4)—by correlating the actual trajectory of the stylus 8 with the three possible trajectories—the system can anticipate that the "OK" control area 10 will be enabled and, accordingly, pre-cache the functionality defined by control area 10. Applying the method according to the invention, the functionality defined by control area 10 can be enabled well before the user actually touches control area 10 with the stylus 8.

The method of the present invention can be applied to a variety of systems, including, for example, systems using an inductive stylus and tablet and a radio frequency stylus and tablet.

The present embodiment may also include an apparatus that will perform the method as described herein.

We claim:

1. A method of pre-caching user interaction elements, which comprises:

monitoring motion patterns with an electronic input device having a gesture recorder and a writing surface using a three-dimensional position of the recorder with respect to the writing surface;

providing one or more control areas at the writing surface;

analyzing the monitored motion patterns made while the recorder is off the writing surface to determine if the recorder is approaching the writing surface;

when it is determined that the recorder is approaching the writing surface, defining a plurality of trajectories between the recorder and each of the one or more control areas based upon the location and movement of the recorder off the writing surface;

monitoring an actual trajectory of the recorder;

correlating the plurality of trajectories with the actual trajectory; and for one of the plurality of trajectories with a highest degree of correlation, defining a corresponding control area as at least one target area, the at least one target area having an associated functionality; and triggering at least one aspect of the functionality before contact between the recorder and the at least one target area.

2. The method according to claim 1, wherein the analyzing step comprises analyzing the recorder position to determine if the recorder is moving towards a single target area.

3. The method according to claim 2, wherein the monitoring and analyzing steps are repeated until a determination is made that the recorder is moving towards the single target area.

4. The method according to claim 1, wherein the monitoring and analyzing steps are repeated until it is determined that the recorder is approaching at least one target area at the writing surface.

5. The method according to claim 4, which comprises:

determining a two-dimensional location of the recorder with respect to a plane of the writing surface when a determination is made that the recorder is approaching at least one target area at the writing surface; and defining a trajectory based upon the two-dimensional location and movement of the recorder off the writing surface.

6. The method according to claim 5, which comprises providing control areas at the writing surface.

7. The method according to claim 6, which comprises:

identifying at least one of the control areas disposed approximately at an endpoint of the trajectory; and defining the at least one of the control areas as the at least one target area.

8. The method according to claim 7, wherein the at least one target area is one target area, the identifying step comprises identifying one of the control areas, and the defining step comprises defining the one of the control areas as the one target area.

9. The method according to claim 7, wherein the triggering step comprises triggering corresponding preliminary actions that are necessary to execute the functional that is assigned to the at least one of the control areas simultaneously.

10. The method according to claim 7, wherein the triggering step comprises triggering corresponding preliminary actions that are necessary to execute the functional that is assigned to the at least one of the control areas sequentially.

11. The method according to claim 1, wherein the monitoring step, the analyzing step, and the triggering step are repeated and performed continuously.

12. The method according to claim 1, wherein the recorder is a stylus.

13. The method according to claim 1, which comprises recording the motion patterns.

14. The method according to claim 1, which comprises electronically displaying the on-surface motion patterns upon the writing surface and not displaying the off-surface motion patterns.

15. A method of pre-caching user interaction elements, which comprises:
   monitoring motion patterns with an electronic input device having a gesture recorder and a writing surface using a three-dimensional position of the recorder with respect to the writing surface;
   analyzing the monitored motion patterns made while the recorder is off the writing surface including:
      determining if the recorder is moving towards the writing surface, and
      determining if the recorder is approaching at least one target area at the writing surface, the at least one target area having an associated functionality,
   wherein the monitoring and analyzing steps are repeated until it is determined that the recorder is moving towards the writing surface;
   providing control areas at the writing surface;
   when it is determined that the recorder is moving towards the writing surface, defining a plurality of trajectories between the recorder and each of the control areas based upon the location and movement of the recorder off the writing surface;
   monitoring an actual trajectory of the recorder;
   correlating the plurality of trajectories with the actual trajectory; and
   for one of the plurality of trajectories with a highest degree of correlation, defining a corresponding control area as the at least one target area; and
   triggering at least one aspect of the functionality before contact between the recorder and the at least one target area.

16. The method according to claim 15, wherein the at least one target area is one target area, and the defining a corresponding control area step comprises defining the corresponding control area as the one target area.

17. In a process for monitoring motion patterns, a method of pre-caching user interaction elements, which comprises:
   monitoring motion patterns with an electronic input device having a gesture recorder and a writing surface using a three-dimensional position of the recorder with respect to the writing surface;
   providing one or more control areas at the writing surface;
   analyzing the monitored motion patterns made while the recorder is off the writing surface to determine if the recorder is approaching the writing surface;
   when it is determined that the recorder is approaching the writing surface, defining a plurality of trajectories between the recorder and each of the one or more control areas based upon the location and movement of the recorder off the writing surface;
   monitoring an actual trajectory of the recorder;
   correlating the plurality of trajectories with the actual trajectory; and
   for one of the plurality of trajectories with a highest degree of correlation, defining a corresponding control area as at least one target area, the at least one target area having an associated functionality; and
   triggering at least one aspect of the functionality before contact between the recorder and the at least one target area.

18. In a process for monitoring motion patterns using an inductive stylus and tablet system, a method of pre-caching user interaction elements, which comprises:
   monitoring motion patterns with an electronic input device having an inductive stylus and a tablet having a writing surface using a three-dimensional position of the stylus with respect to the tablet;
   providing one or more control areas at the writing surface;
   analyzing the monitored motion patterns made while the stylus is off the writing surface to determine if the stylus is approaching the writing surface of the tablet;
   when it is determined that the stylus is approaching the writing surface, defining a plurality of trajectories between the stylus and each of the one or more control areas based upon the location and movement of the stylus off the writing surface;
   monitoring an actual trajectory of the stylus;
   correlating the plurality of trajectories with the actual trajectory; and
   for one of the plurality of trajectories with a highest degree of correlation, defining a corresponding control area as at least one target area, the at least one target area having an associated functionality; and
   triggering at least one aspect of the functionality before contact between the stylus and the at least one target area.

19. In a process for monitoring motion patterns using a radio frequency stylus and tablet system, a method of pre-caching user interaction elements, which comprises:
   monitoring motion patterns with an electronic input device having a radio frequency stylus and a tablet having a writing surface using a three-dimensional position of the stylus with respect to the tablet;
   providing one or more control areas at the writing surface;
   analyzing the monitored motion patterns made while the stylus is off the tablet to determine if the stylus is approaching the writing surface of the tablet;
   when it is determined that the stylus is approaching the writing surface, defining a plurality of trajectories between the stylus and each of the one or more control areas based upon the location and movement of the stylus off the writing surface;
   monitoring an actual trajectory of the stylus;

correlating the plurality of trajectories with the actual trajectory; and for one of the plurality of trajectories with a highest degree of correlation, defining a corresponding control area as at least one target area, the at least one target area having an associated functionality; and triggering at least one aspect of the functionality before contact between the stylus and the at least one target area.

20. In a method for monitoring motion patterns of the type wherein a system for monitoring the motion patterns monitors the gestures at a writing surface using a gesture recorder, the writing surface including control areas with associated functionalities, the motion patterns including movements while the recorder is on the writing surface and movements while the recorder is off the writing surface, and analyzes the motion patterns using the monitored motion patterns, the improvement, which comprises:

analyzing the monitored motion patterns made while the recorder is off the writing surface to determine if the recorder is approaching one of the control areas at the writing surface;

when it is determined that the recorder is approaching the writing surface, defining a plurality of trajectories between the recorder and each of the one or more control areas based upon the location and movement of the recorder off the writing surface;

monitoring an actual trajectory of the recorder;

correlating the plurality of trajectories with the actual trajectory; and for one of the plurality of trajectories with a highest degree of correlation, defining a corresponding control area as at least one target area; and triggering at least one aspect of the associated functionality of the one control area before contact between the recorder and the control area.

* * * * *